Aug. 10, 1926.
1,595,512
A. GLOGGER
MOTOR LORRY WITH TRAILER
Filed Feb. 1, 1924     3 Sheets-Sheet 3
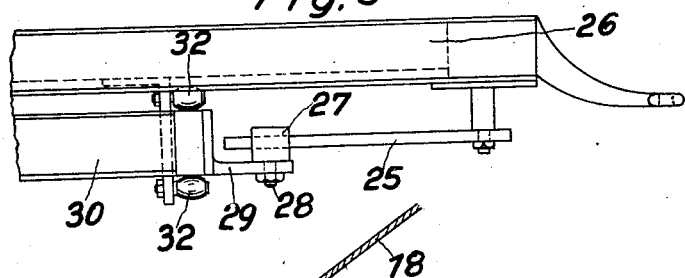
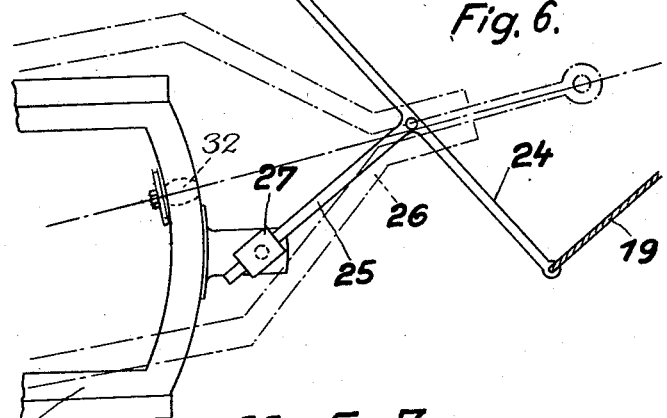
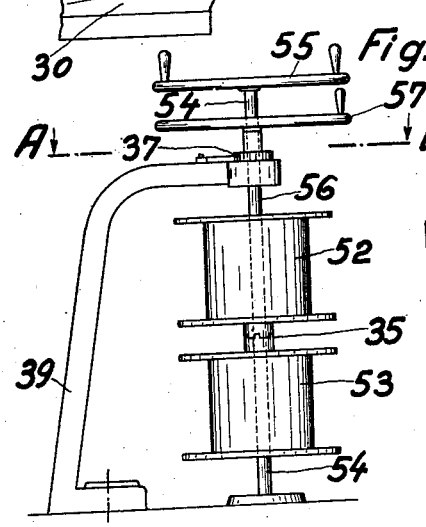
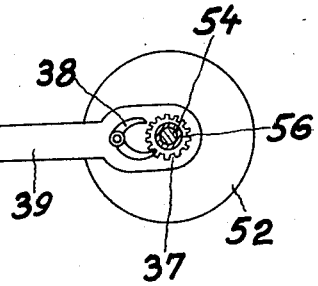
Inventor:
Adolf Glogger, sen.
by  Steinhaus
        Attorney.

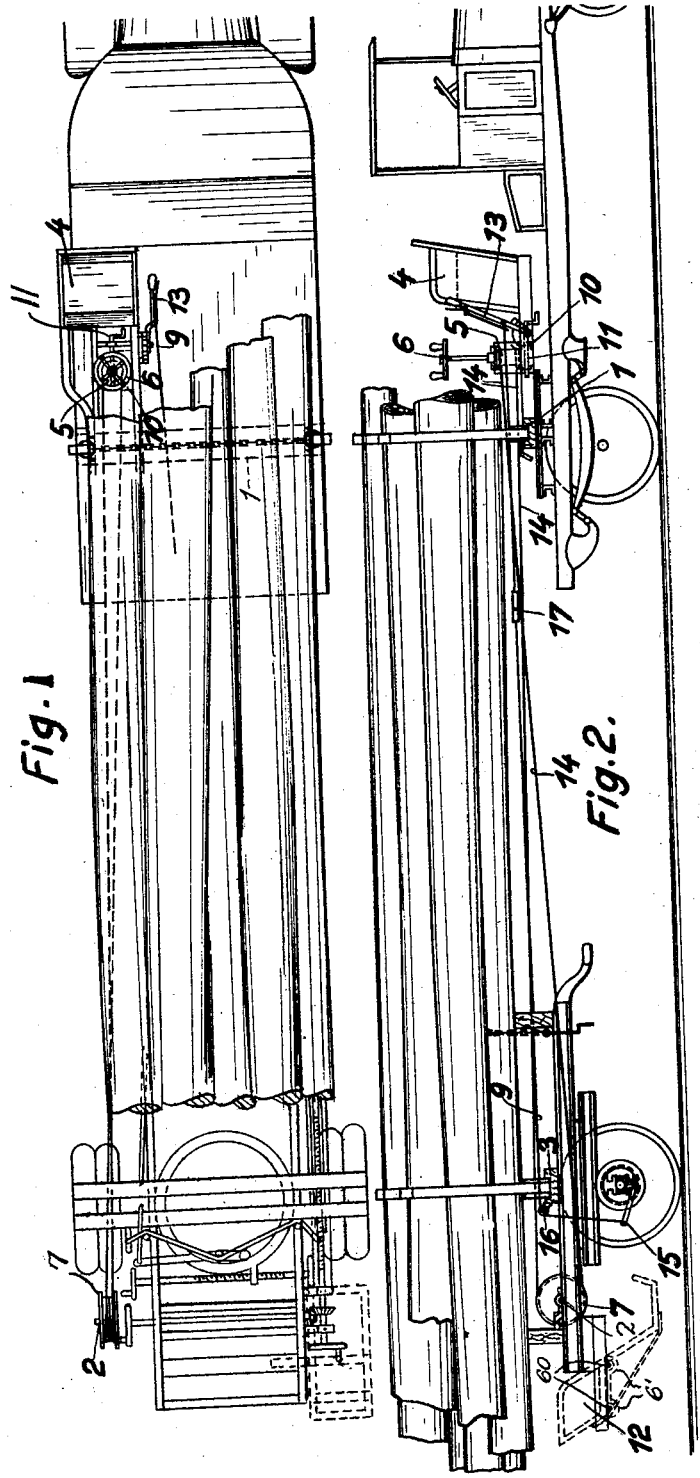

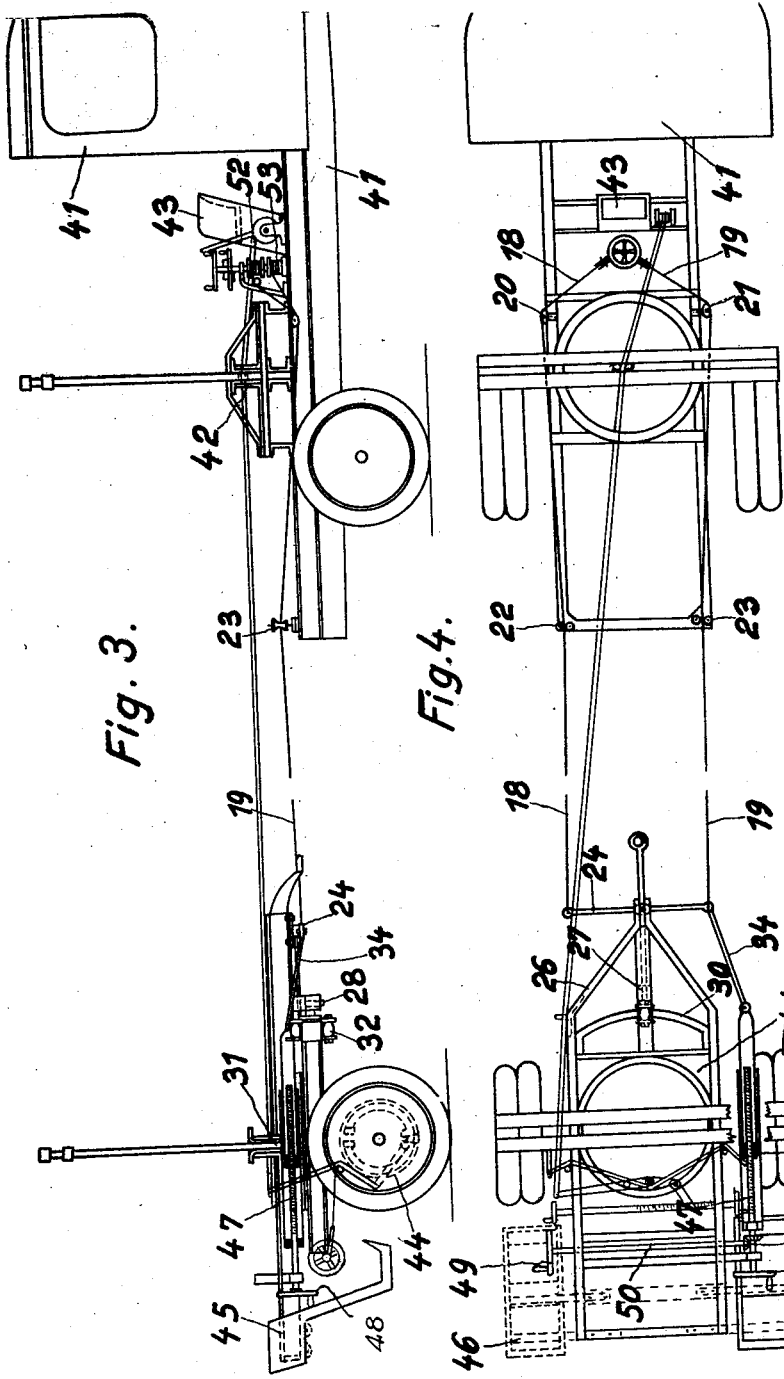

Patented Aug. 10, 1926.

1,595,512

UNITED STATES PATENT OFFICE.

ADOLF GLOGGER, OF AUGSBURG, GERMANY.

MOTOR LORRY WITH TRAILER.

Application filed February 1, 1924, Serial No. 690,090, and in Germany January 30, 1923.

My invention refers to motor lorries with trailers and more particularly to the means for steering and braking the trailer. It is a particular object of my invention to improve the steering and braking of the trailer.

In the transport of goods of considerable length, such as logs and the like, motor lorries have been used which were connected with two-wheeled trailers provided with means for being steered and braked independently of the motor lorry.

According to the present invention, the steering and braking of the trailer can be effected either from the motor lorry or from one or the other side of the trailer itself, according to the requirements of each individual case.

According to one modification of my invention, I can arrange on the bogie provided on the motor lorry for the support of the forward ends of the logs or the like and in close proximity to the driver's seat, means permitting a steersman to operate the steering and braking devices for the trailer from the bogie. This arrangement entails an unlimited supervision of the road on which the train of waggons is travelling and of the train of waggons itself, thereby warranting a high degree of safety in the operation of the steering and braking devices. It further offers the advantage that the steersman attending to the trailer can always easily and quickly enter into communication with the driver of the motor lorry. Furthermore, as compared with an arrangement wherein the steersman seat is located directly on the trailer, the steersman for the trailer is better protected against dust and dirt and against contact with other vehicles on the road.

In the case where the particular conditions of the road or of the load to be transported render it desirable to effect the steering and braking from one side of the trailer, I have made provision for temporarily attaching the steersman seat to one or the other side of the trailer. In connection therewith, provision can be made for temporarily fastening the means for adjusting the steering and braking means, according to requirements, on the right or on the left-hand side of the trailer. This arrangement offers the advantage that, in accordance with the particular situation and other conditions of the road, the trailer can be steered and braked either from the right or from the left.

In the drawings affixed to this specification and forming part thereof several arrangements embodying my invention are illustrated diagrammatically by way of example. In the drawings Figs. 1 and 2 are a plan view and a side elevation respectively, of the first modification, Fig. 3 is a side elevation and Fig. 4 a plan view of a second modification, Fig. 5 is a side elevation of part of the trailer shown in Fig. 3 drawn to a larger scale, while Fig. 6 is a plan view corresponding to Fig. 5.

Fig. 7 is a side elevation showing the way in which the cable drums are disposed and Fig. 8 is a horizontal cross section on the line A—B in Fig. 7.

Referring first to Figs. 1 and 2, 4 is the steersman seat located on the bogie 1 in close proximity to and back to back with the driver's seat 4ª. From the steersman seat 4 two-wheeled trailer 3 is steered and braked. The steersman seat can be arranged on the right-hand side or, as shown in the drawings, on the left-hand side of the motor lorry, but the arrangement can also be such that the steersman seat and the means for operating the steering and braking of the trailer can be shifted from one side of the motor lorry to the other.

The trailer 3 is steered from the steersman seat 4 by means of a steering wheel 6 mounted, in the modification shown in the drawings, on a vertical spindle arranged to operate a cable drum 5. From this drum a steel cable 14 extends to the cable drum 7 mounted on the steering spindle 2 of the trailer. The rotary movement of this steering spindle 2 can be transmitted onto the chassis of the trailer in a well known manner, for instance (as will be explained further below more specifically with reference to Figs. 3 to 8) by locating in the body of the trailer a screw spindle which acts by means of a nut mounted on it onto a double lever (not shown) which, as the spindle is turned and the nut is thereby displaced, receives a swinging motion and takes the chassis of the trailer along with it. The arrangement can, however, also be such that the screw spindle 2 acts by means of the nut mounted on it onto rods pivotally engaging the chassis.

According to the length of the logs or other goods to be transported, it must be possible to adjust the length of the steel cable 14 according to requirements by increasing or decreasing it within a range of 30 to 75 feet. In accordance therewith the cable drums 5 and 7 must be provided with a great number of grooves in order to be able to wind up the steel cable as desired. By these means the steering of the trailer can be effected, no matter how long the logs or other material to be transported are.

In order to provide for a tensioning of the steel cable 14, the cable drum 5 is mounted on a support 10 arranged to be adjusted by means of a horizontally disposed spindle 11, as by these means the steel cable can always be placed under tension, the steering means are always kept in operative condition. Braking of the trailer is effected by means of the brake lever 13 acting upon a second cable 9 which actuates a lever 15 mounted on the trailer and passes over a guide sheave 16, lever 15 moving the brake blocks in a well known manner.

The free length of the braking cable can be varied by means of loops or by tightening a cable clamp 17 inserted in the cable.

In order to provide for special cases, I have made arrangements for mounting laterally of the trailer another steersman's seat 12, either on the right-hand side or on the left-hand side, and preferably in an exchangeable manner, horizontal arms 60 fixed to the seat being inserted in eyes 61 secured to the chassis, so that, according to requirements, the seat can be mounted on the right or left of the trailer. In accordance therewith, means for adjusting the braking and steering devices can be mounted on the trailer in an exchangeable or disengageable manner as explained more fully further below with reference to Figs. 3 to 8.

In the modification shown in Figs. 3–8, 41 is the motor lorry, 42 the bogie and 43 the steersman seat which is here mounted in the axial plane of the bogie. 44 is the two wheeled trailer and 45, 46 are steersman seats mounted on both sides of the latter, so that, in the case where the trailer shall not be steered from the seat 43 on the motor lorry, steering can be effected from either side of the trailer. Within reach of the steersman seated on the seat 45 mounted on the trailer, a spindle 47 is mounted in parallel to the longitudinal axis of the trailer, 48 being a hand wheel for operating this spindle. In the case where the steersman is seated on the left-hand seat 46, he can operate the spindle 47 by means of a hand wheel 49 mounted on a cross spindle 50 acting on spindle 47 by means of bevel gearing 51.

The steersman seats 45 and 46 can be arranged to be disengaged or exchanged in such manner that a single seat can be mounted on the right or left-hand side of the trailer, according to requirements. I may, however, also arrange the steersman seats to be folded, so that, while not in use, they can be folded and hidden below the frame of the trailer without projecting sideways.

Within reach of the steersman seated on the seat 43 mounted on the motor lorry 41 there are arranged two cable drums 52, 53, the latter of which is mounted on a solid spindle 56 adapted to be operated by means of a hand wheel 57 which, in the modification shown in the drawings, is located below the hand wheel 55. In turning one wheel, for instance 55, one of the drums, for instance 53, is turned and by turning the other hand wheel, the other drum is operated.

From each of the drums a cable 18 and 19, respectively, extends to laterally arranged guide sheaves 20, 21 and from here alongside of the motor lorry 41 to double sheaves 22, 23, serving to guide the cables. From these sheaves the cables extend in the same direction and without being crossed, to opposite ends of a pole-like double lever 24 pivotally mounted at the front edge of the body 26 of the trailer 44. With the double lever 24ª rearwards extending lever 25 is connected in such a manner that a T-shaped member is formed. The cylindrical rear end of the lever arm 25 is guided in a circular boring of a socket 27 mounted on a vertical pin 28 extending through a plate 29 of the chassis. In view of this arrangement, if the double lever is oscillated for instance as shown in Fig. 6, the socket 27 will be turned and the lever arm 25 will be free to be displaced in one or the other direction relatively to the socket, whereby the necessary steering capacity is warranted for the chassis 30 of the trailer. Fig. 6 shows how, on the levers 24, 25 being oscillated, the chassis 30 moves relatively to the body 26 drawn in dot-dash lines.

In order to impart an increased strength to these parts and more particularly to preserve as far as possible the middle bearing 31 shown in Fig. 3, two guide rollers 32 (Figs. 5 and 6) are mounted above and below the curved front rail of the chassis 30, these rollers being mounted rotatably on an arm 62 extending downwards on the body 26.

If it is desired to steer the trailer from a seat on the trailer, for instance the right-hand seat 45, the rotary movement of the screw spindle 47 effected by means of hand wheel 48 will be transmitted onto a nut 33 which is thereby displaced longitudinally and acts upon a rod 34 hinged to one end of the double lever 24, whereby this latter is oscillated either to the right or to the left, thereby steering the trailer in the corresponding direction.

If the steersman is seated on the left-hand seat 46, the same movement is effected by means of hand wheel 49, cross spindle 50 and bevel gearing 51 acting on spindle 47.

In either case, whether steering from the right or from the left-hand side of the trailer, the steel cables or the like 18 and 19 which, when steering from the motor lorry, are attached to the ends of the double lever 24, must be disengaged from this lever.

For steering the trailer from the motor lorry, the hand wheels 55 and 57, respectively, are operated according to whether the trailer shall be steered to the right or to the left. To this end the rear ends of the cables 18 and 19 must be attached to the free ends of the double lever 24. According to whether one or the other of the two wheels 55 and 57 is turned, a pull is exerted either on cable 18 or on cable 19, the other cable being loosened at the same time. By this pull the double lever 24 is oscillated and the chassis of the trailer is turned.

The two cable drums 52 and 53 can be connected with one another by means of a claw coupling 35, provision being thus made for steering the trailer to the right or to the left merely by moving one of the two wheels.

This coupling 35 is thrown in in the case where the road requires the train of waggons to be alternately steered to one or the other direction. If, however, the road mainly requires steering in one direction, the coupling can be thrown out and steering can be effected by means of one or the other drum.

I have further provided means for steering also by positive motion, this being possible in the case where a road devoid of unduly great curves can be used. To this end I provide a pawl and ratchet device 37 which with the coupling 35 thrown in acts towards locking the two cable drums 52, 53. As shown in Figs. 7 and 8, the ratchet wheel is preferably mounted onto the hollow spindle 56, while the pawl 38 is mounted on an arm 39 of the motor lorry 41. By throwing in the pawl, the trailer will be steered automatically without the driver being required to operate the steering device. Automatic steering is effected by the motor lorry on entering a curve, exerting a one-sided pull on one of the ropes 18 and 19, respectively, passing through between the double rollers 22 and 23, respectively, thereby causing the double lever 24 to be oscillated in the direction of steering of the motor lorry 41. However, if the condition of the road requires the driver or steersman to operate the steering device, he will merely release the pawl and ratchet device and operate either wheel 55 or the two wheels 55 and 57, as described above.

I wish it to be understood that I do not desire to be limited to the exact details of construction shown and described, for obvious modifications will occur to a person skilled in the art.

I claim:

1. The combination with a motor lorry, of a trailer and steering means allowing selective steering of said trailer from said lorry and from the rear end of said trailer, respectively.

2. The combination with a motor lorry, of a trailer and steering and braking means allowing selective steering and braking of said trailer from said lorry and from the rear end of said trailer, respectively.

3. The combination with a motor lorry, of a trailer, a driver's seat on said lorry and steering means allowing selective steering of said trailer from a place near said driver's seat and from the rear end of said trailer, respectively.

4. The combination with a motor lorry, of a trailer, a driver's seat on said lorry and steering and braking means allowing selective steering and braking of said trailer from a place near said driver's seat and from the rear end of said trailer, respectively.

5. The combination with a motor lorry, of a trailer and steering means allowing selective steering of said trailer from said lorry and from one side near the rear end of said trailer, respectively.

6. The combination with a motor lorry, of a trailer and steering means allowing selective steering of said trailer from said lorry and from one or the other side near the rear end of said trailer, respectively.

7. The combination with a motor lorry, of a trailer, a driver's seat and a steersman's seat arranged back to back on said lorry and steering means allowing selective steering of said trailer from said steersman's seat and from the rear end of said trailer, respectively.

8. The combination with a motor lorry, of a trailer, a driver's seat and a bogie on said lorry, a steersman's seat on said bogie back to back with said driver's seat and steering means allowing selective steering of said trailer from said steersman's seat and from the rear end of said trailer, respectively.

9. The combination with a motor lorry, of a trailer, steering and braking devices for said trailer mounted on said lorry for longitudinal displacement thereon and steering and braking means on said trailer adapted to be selectively actuated from said devices on the lorry and from the rear end of said trailer.

10. The combination, with a motor lorry, of a trailer, a steering wheel on said lorry, a cable drum operatively connected with said steering wheel, a steering spindle on said trailer and a second cable drum on said spindle, said drums being large enough to vary the length of the cable in accordance with the distance between said lorry and said trailer without impairing the steering facilities.

11. The combination, with a motor lorry, of a trailer, a steering wheel on said lorry, a cable drum operatively connected with said steering wheel, a steering spindle on said trailer and a second cable drum on said spindle, said drums being large enough to vary the length of the cable in accordance with the distance between said lorry and said trailer without impairing the steering facilities and means for varying the position of said first drum.

12. The combination, with a motor lorry, of a trailer, a steering wheel on said lorry, a cable drum operatively connected with said steering wheel, a steering spindle on said trailer and a second cable drum on said spindle, said drums being large enough to vary the length of the cable in accordance with the distance between said lorry and said trailer without impairing the steering facilities, means supporting said first drum and means for varying the position of said supporting means.

13. The combination, with a motor lorry, of a trailer, a bogie forming part of said lorry, a steersman's seat on said bogie and means for steering said trailer from said steersman's seat and from one side of said trailer, respectively, said steersman's seat and the steering means on said bogie being arranged for displacement from one side of said bogie to the other side.

14. The combination, with a motor lorry, of a trailer, means for steering said trailer from said lorry and from one side of said trailer, respectively, means on one side said trailer for steering and braking said trailer and means for actuating said steering and braking means also from the other side of said trailer.

15. The combination, with a motor lorry, of a trailer, a driver's seat on said lorry, means for steering said trailer from a place near said driver's seat and from one side of said trailer, respectively, two cable drums disposed near said driver's seat, a body on said trailer, means pivoted to said body and adapted to turn said trailer and cables extending from said drums to said turning means.

16. The combination, with a motor lorry, of a trailer, a driver's seat on said lorry, means for steering said trailer from a place near said driver's seat and from one side of said trailer, respectively, two cable drums disposed near said driver's seat, said drums being arranged coaxially for independent rotation, means for coupling said drums, a body on said trailer, means pivoted to said body and adapted to turn said trailer and cables extending from said drums to said turning means.

17. The combination, with a motor lorry, of a trailer, a driver's seat on said lorry, means for steering said trailer from a place near said driver's seat and from one side of said trailer, respectively, two cable drums disposed near said driver's seat, a body on said trailer, means pivoted to said body and adapted to turn said trailer, cables extending from said drums to said turning means and a pawl and ratchet device for locking said drums against rotation.

18. The combination, with a motor lorry, of a trailer, a driver's seat on said lorry, means for steering said trailer from a place near said driver's seat and from one side of said trailer, respectively, two cable drums disposed near said driver's seat, a body on said trailer, a T-shaped piece pivoted to said body, a cable extending between each drum and one end of the cross arm of said piece and socket hinged to said trailer and arranged for guiding the longitudinal arm of said piece.

19. The combination, with a motor lorry, of a trailer, a driver's seat on said lorry, means for steering said trailer from a place near said driver's seat and from one side of said trailer, respectively, two cable drums disposed near said driver's seat, a body on said trailer, means pivoted to said body and adapted to turn said trailer, cables extending from said drums to said turning means, a connecting rod hinged to one end of said turning means and means for displacing said rod arranged on one side of said trailer.

20. The combination, with a motor lorry, of a trailer, a driver's seat on said lorry, means for steering said trailer from a place near said driver's seat and from one side of said trailer, respectively, two cable drums disposed near said driver's seat, a body on said trailer, means pivoted to said body and adapted to turn said trailer, cables extending from said drums to said turning means, a connecting rod hinged to one end of said turning means, a screw spindle for displacing said rod arranged on one side of said trailer and means for operating said spindle also from the other side of said trailer.

In testimony whereof I affix my signature.

ADOLF GLOGGER.